United States Patent
Lin et al.

(10) Patent No.: US 8,082,055 B2
(45) Date of Patent: Dec. 20, 2011

(54) METHOD FOR A BIN RATIO FORECAST AT NEW TAPE OUT STAGE

(75) Inventors: Chun-Hsien Lin, Hsin Chu (TW); Andy Tsen, Chung-Ho (TW); Jui-Long Chen, Taichung (TW); Sunny Wu, Zhudong Town (TW); Jong-I Mou, Hsinpu Township, Hsinchu County (TW); Chia-Hung Huang, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 386 days.

(21) Appl. No.: 12/499,345

(22) Filed: Jul. 8, 2009

(65) Prior Publication Data
US 2011/0010215 A1    Jan. 13, 2011

(51) Int. Cl.
*G06F 19/00* (2006.01)
(52) U.S. Cl. .......... 700/103; 700/99; 700/110; 700/121
(58) Field of Classification Search .......... 700/103, 700/121, 106, 107, 110, 97, 99; 702/180; 438/14
See application file for complete search history.

(56) References Cited

U.S. PATENT DOCUMENTS

| | | | |
|---|---|---|---|
| 6,610,550 B1 * | 8/2003 | Pasadyn et al. | 438/14 |
| 6,901,564 B2 * | 5/2005 | Stine et al. | 700/121 |
| 7,580,924 B1 * | 8/2009 | Ling et al. | 1/1 |
| 2006/0241802 A1 * | 10/2006 | Chen et al. | 700/121 |
| 2010/0268367 A1 * | 10/2010 | Wu et al. | 700/110 |

* cited by examiner

*Primary Examiner* — Albert Decady
*Assistant Examiner* — Steven Garland
(74) *Attorney, Agent, or Firm* — Haynes and Boone, LLP

(57) ABSTRACT

A method for providing a bin ratio forecast at an early stage of integrated circuit device manufacturing processes is disclosed. The method comprises collecting historical data from one or more processed wafer lots; collect measurement data from one or more skew wafer lots; generating an estimated baseline distribution from the collected historical data and collected measurement data; generating an estimated performance distribution based on one or more specified parameters and the generated estimated baseline distribution; determining a bin ratio forecast by applying a bin definition and a yield degradation factor estimation to the generated estimated performance distribution; determining one or more production targets based on the bin ratio forecast; and processing one or more wafers based on the one or more determined production targets.

20 Claims, 7 Drawing Sheets

METHOD FOR A BIN RATIO FORECAST AT NEW TAPE OUT STAGE

BACKGROUND

The semiconductor integrated circuit (IC) industry has experienced rapid growth. A conventional semiconductor manufacturing process involves processing one or more wafer lots, each wafer lot including one or more wafers. The wafers are eventually cut into a plurality of die, and each die contains a complete IC device. The IC devices of a wafer lot often exhibit varying IC characteristics, which can be classified into various bin categories (i.e., BIN 1, BIN 2, BIN 3, . . . etc.). For example, IC devices classified as BIN 1 (i.e., bin category 1) may have higher speed and are thus regarded as one category, while IC devices classified as BIN 7 (i.e., bin category 7) may have a lower leakage current and are therefore regarded as another category. Other bin categories may be defined according to various electric parameters and/or parameter ranges. The bin categories may be associated with various yields.

Each wafer lot may be characterized by a bin ratio, which represents the ratio (or percentage) of the lot exhibiting IC characteristics associated with each bin category. For example, if there are three bin categories, the bin ratio (BIN 1:BIN 2:BIN 3) of a wafer lot may be 2:1:1. In other words, 50% of the die in the wafer lot will exhibit IC characteristics associated with BIN 1, 25% of the die in the wafer lot will exhibit IC characteristics associated with BIN 2, and 25% of the die in the wafer lot will exhibit IC characteristics associated with BIN 3. A customer often specifies particular IC characteristics when ordering IC devices, thus a customer's order is associated with one or more bin categories. Conventional bin ratio forecasting systems and methodology exhibit a larger than desirable prediction error and lacks the ability to predict a bin ratio for a wafer lot at an earlier stage. Thus, it is desirable to be able to predict the bin ratio for wafer lots that will be processed based on the customer's order at an earlier stage and control the bin ratio.

Accordingly, what is needed is a method and system that addresses the above stated issues.

SUMMARY

The present disclosure provides one embodiment of a method for providing a bin ratio forecast at an early stage of an integrated circuit device fabrication process, in which a bin is associated with one or more characteristics exhibited by an IC device. The method includes collecting historical data from one or more processed wafer lots; collecting measurement data from one or more skew wafer lots; generating an estimated baseline distribution from the collected historical data and collected measurement data; and generating an estimated performance distribution based on one or more specified parameters and the generated estimated baseline distribution. A bin ratio forecast may be determined by applying a bin definition and a yield degradation factor estimation to the generated estimated performance distribution. From the bin ratio forecast, one or more production targets may be determined, the fabrication resources are provided, and one or more wafers may be processed based on the one or more determined production targets.

In another embodiment, the present disclosure provides a method for providing a bin ratio forecast prior to a mass production stage of a plurality of integrated circuit devices fabricating integrated circuit devices. The method includes generating a simulated wafer acceptance test (WAT) baseline distribution; generating a simulated circuit performance distribution from the generated simulated WAT distribution; portioning the generated simulated circuit performance distribution into one or more bin categories based on a bin definition; determining a bin ratio forecast by applying a yield degradation factor to each bin category; determining a wafer quantity to begin processing and device targets based on the determined bin ratio forecast; and processing the determined wafer quantity according to the determined device targets.

In one embodiment, the disclosure provides a system for providing a bin ratio forecast prior to a mass production stage in a semiconductor manufacturing environment. The system includes a virtual fabrication system coupled to a network and a manufacturing execution system (MES) coupled to the network. The MES includes a bin-based control module configured to collect historical data from one or more processed wafer lots; collect measurement data from one or more skew wafer lots; generate an estimated baseline distribution based on the collected historical data and collected measurement data; generate an estimated performance distribution based on one or more specified parameters and the generated estimated baseline distribution; determine a bin ratio forecast by applying a bin definition and a yield degradation factor estimation to the generated estimated performance distribution; determine one or more production targets based on the bin ratio forecast; and process one or more wafers based on the one or more determined production targets.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
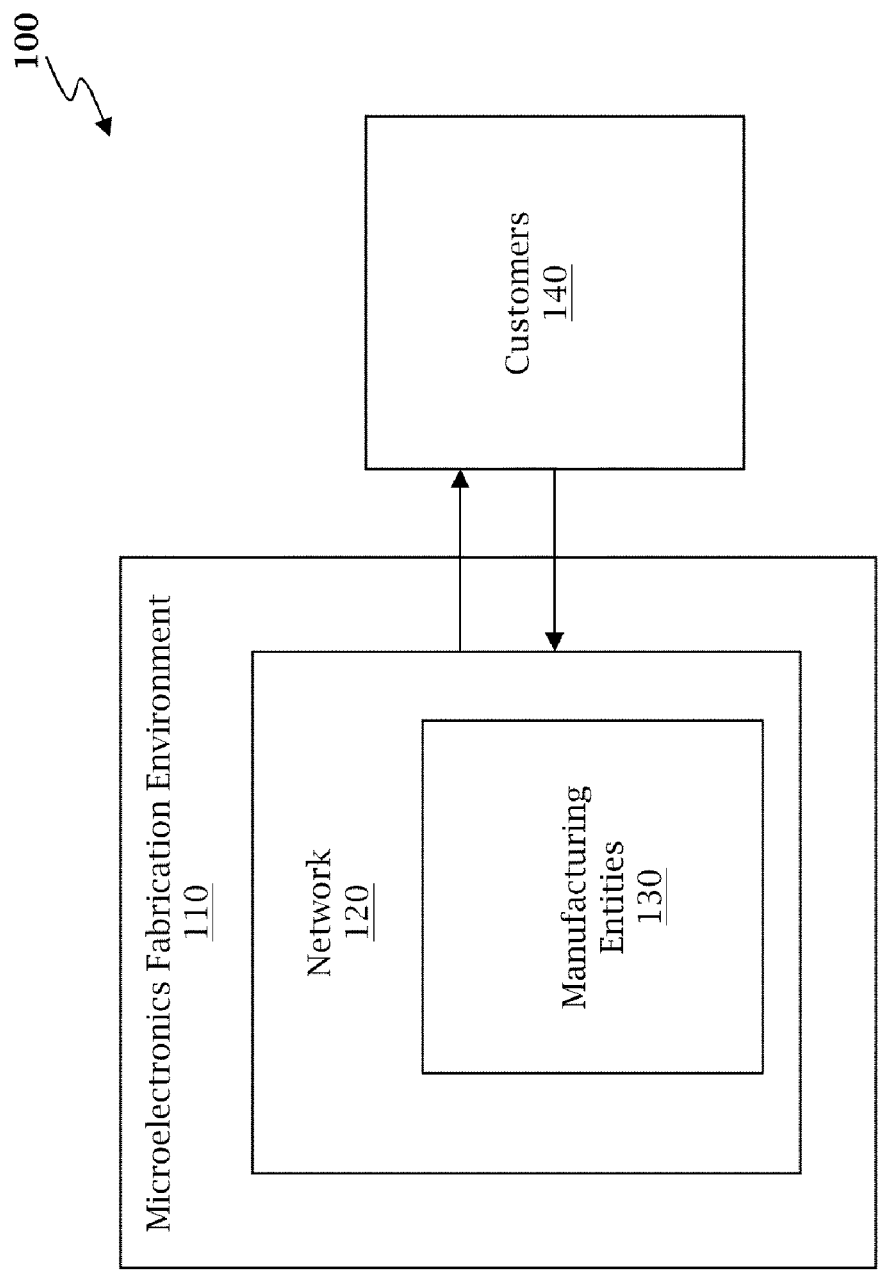
FIG. 1 is a block diagram of a system in which various embodiments disclosed herein are implemented.

The present disclosure relates generally to semiconductor manufacturing systems, and more particularly, to a method for providing a bin ratio forecast at an early stage of a semiconductor manufacturing process.

It is understood that the following disclosure provides many different embodiments, or examples, for implementing different features of the invention. Specific examples of components and arrangements are described below to simplify the present disclosure. In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates a schematic view of one embodiment of a system 100 constructed according to aspects of the present disclosure. The system 100 includes a microelectronics fabrication environment 110, a network 120, and a plurality of manufacturing entities 130. A plurality of customers can be in communication with the microelectronics fabrication environment 110. The microelectronics fabrication environment 110 includes a microelectronics fabrication business, including a myriad of manufacturing facilities for the fabrication of a variety of different microelectronics products. For example, there may be a manufacturing facility for the front end fabrication of a plurality of microelectronics products (i.e., front-end-of-line (FEOL) fabrication), while a second manufacturing facility may provide the back end fabrication for the interconnection and packaging of the microelectronics products (i.e., back-end-of-line (BEOL) fabrication), and a third manufacturing facility may provide other services for the foundry business. The fabrication business may further include an unlimited number of fabrication facilities interconnected through the network 120.

The network 120 includes a plurality of interconnecting nodes for the communication of manufacturing information. The information may include a plurality of message databases for the control and extraction of information from the manufacturing entities 130. The plurality of manufacturing entities 130 include a plurality of manufacturing process tools, metrology tools, customer interfaces, design databases, a manufacturing executing system (MES), and other entities associated with the microelectronics fabrication environment 110. The network 120 provides interconnection between manufacturing facilities of the microelectronics fabrication environment 110 and may further include wired and/or wireless interconnections. The network 120 further provides interconnection between the manufacturing fabrication environment 110 and the plurality of customers 140.

Figure 2:
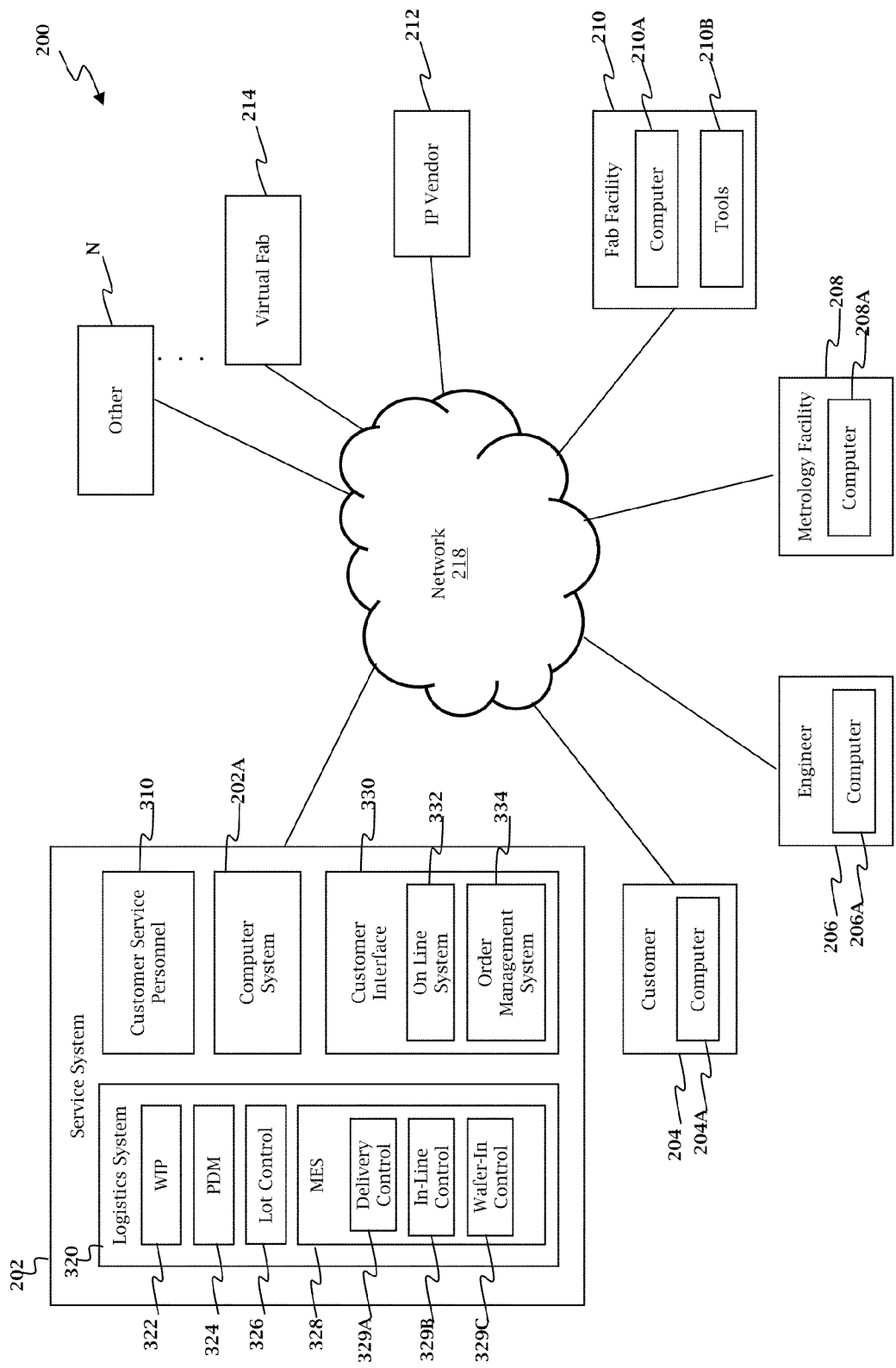
FIG. 2 is a block diagram of a virtual IC fabrication system in which various embodiments disclosed herein are implemented.

Referring now to FIG. 2, a product manufacturing facility, such as a virtual IC fabrication system (a "virtual fab") 200, within which the methodology associated with system 100 of FIG. 1 may be practiced, is illustrated. The virtual fab 200 includes a plurality of entities 202, 204, 206, 208, 210, 212, 214 . . . , N that may be connected by a communications network 218. The network 218 may be a single network, or may be a variety of different networks, such as an intranet and the Internet. The network 218 may include both wireline and wireless communication channels. In some embodiments, the network 218 is similar to the network 120 described above.

The virtual fab 200 enables interaction among the entities 202-214 for the purpose of IC manufacturing, as well as the provision of services. For example, IC manufacturing includes receiving a customer's IC order (e.g., design of the ICs), performing the associated operations needed to produce the ordered ICs (e.g., fabrication of the ICs), and sending the ordered ICs to the customer (e.g., testing and shipping of the ICs). In the present embodiment, the entity 202 represents a service system for service collaboration and provision, the entity 204 represents a customer, the entity 206 represents an engineer, the entity 208 represents a metrology facility (or tool) for IC testing and measurement, the entity 210 represents a fabrication (fab) facility, the entity 212 represents an IC design intellectual properties (IP) vendor, and the entity 214 represents another virtual fab (e.g., a virtual fab belonging to a subsidiary or a business partner). Each entity may interact with other entities and may provide services to and/or receive services from the other entities.

For purposes of illustration, each entity 202-214 may be referred to as an internal entity (e.g., an engineer, customer service personnel, an automated system process, a design or fabrication facility, fab-related facilities (e.g., raw-materials, shipping, assembly or test), etc.) that forms a portion of the virtual fab 200 or may be referred to as an external entity (e.g., a customer, IP vendor, design provider, etc.) that interacts with the virtual fab 200. The internal entities may be directly responsible for producing the end product, such as a wafer or individually tested IC device. The external entities may be facilities not directly associated or under the control of the fab. It is understood that the entities 202-214 may be concentrated at a single location or may be distributed, and that some entities may be incorporated into other entities. In addition, each entity 202-214 may be associated with system identification information that allows access to information within the system to be controlled based upon authority levels associated with each entity's identification information.

Each of the entities 202-214 may include one or more computing devices, such as a personal computer, personal digital assistant, pager, cellular telephone, other suitable computing device, and/or combinations thereof. For example, entities 202, 204, 206, 208, and 210 comprise computer systems and/or computers 202A, 204A, 206A, 208A, and 210A. The computing devices may comprise a central processing unit (CPU), a memory unit, an input/output (I/O) device, and a network interface. Such components may be interconnected by a bus system. It is understood that the computer system may be differently configured and that each of the listed components represent several different components. For example, the CPU may include a multi-processor or a distributed processing system; the memory unit may include different levels of cache memory, main memory, hard disks, and remote storage locations; the I/O device may include monitors and keyboards; and the network interface may be a modem, a wireless transceiver, and/or one or more network interface cards.

The computing devices or systems may be connected to a network, which may be further connected to the network 218. The network may be, for example, a complete network or a subnet of a local area network, a company wide intranet, and/or the Internet. The computing devices may be identified on the network by an address or a combination of addresses, such as a media access control (MAC) address associated with the network interface and an internet protocol (IP) address. Because the computing devices may be connected to the network, certain components may, at times, be shared with other devices. Therefore, a wide range of flexibility is anticipated in the configuration of the computing devices. In some embodiments, the computing devices may act as a server to other devices.

One of the services provided by the virtual fab 200 may enable collaboration and information access in such areas as design, engineering, logistics, and material control. For example, in the design area, the customer 204 may be given access to information and tools related to the design of their product via the service system 202. The tools may enable the customer 204 to perform yield enhancement analysis, view layout information, and obtain similar information. In the engineering area, the engineer 206 may collaborate with other engineers using fabrication information regarding pilot yield runs, risk analysis, quality, and reliability. The logistics area may provide the customer 204 with fabrication status, testing results, order handling, and shipping dates. It is understood that these areas are exemplary, and that more or less information may be made available via the virtual fab 200 as desired. Another service provided by the virtual fab 200 may integrate systems between facilities, such as between the metrology facility 208 and the fab facility 210. Such integration enables facilities to coordinate their activities. For example, integrating the metrology facility 208, fab facility 210, and IP vendor 212, may enable manufacturing (and/or design) information to be incorporated more efficiently into the fabrication process, and may enable data from the metrology tools to be returned to the fab facility 210 for improvement and incorporation.

The service system 202 provides an interface between the customer (e.g., a customer's internal system, such as a computer database) and the IC manufacturing operations, which can include IC fabrication, process control, equipment maintenance, production control, quality and reliability, testing and shipping, customer order system, business management, and financial information. The service system 202 may include customer service personnel 310, a logistics system 320 for order handling and tracking, and a customer interface 330 for enabling a customer to directly access various aspects of an order. The service system 202 may also provide such services as identification validation and access control, both to prevent unauthorized users from accessing data and to ensure that an authorized customer may access only their own data.

The logistics system 320 may include a work-in-process (WIP) inventory system 322, a product data management (PDM) system 324, a lot control system 326, and a manufacturing execution system (MES) 328 having a bin-based control system including a delivery control 329A, an in-line control 329B, and a wafer-in control 329C (collectively referred to as bin-based control system 329). The WIP inventory system 322 may track working lots using a database. The PDM system 324 may manage product data and maintain a product database. The product database could include product categories (e.g., part, part numbers, and associated information), as well as a set of process stages that are associated with each category of products. The lot control system 326 may convert a process stage to its corresponding process steps.

The MES 328 may be an integrated computer system representing the methods and tools used to accomplish production. In the present example, the primary functions of the MES 328 may include collecting data in real time, organizing and storing the data in a centralized database, work order management, workstation management, process management, inventory tracking, and document control. The MES 328 may be connected to other systems both within the service system 202 and outside of the service system 202. Examples of MES systems 328 include Promis™ (a product of Brooks Automation Inc. of Massachusetts), Workstream™ (a product of Applied Materials, Inc. of California), Poseidon™ (a product of IBM Corporation of New York), and Mirl-MES™ (a product of Mechanical Industry Research Laboratories of Taiwan). Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications. The MES 328 may include such information as a process step sequence for each product.

In the present embodiment, the MES 328 comprises a bin-based control system 329. The bin-based control system 329 provides the ability to dynamically control and manage bin quantities and/or demand. The bin-based control system 329 provides bin ratio forecasting methodology. The bin ratio forecasting methodology may be used to determine device targets and wafer quantities for meeting customer demand. The delivery, in-line, and wafer-in controls 329A, 329B, 329C can comprise software to implement controlling and have an ability to handle multiple tasks simultaneously and dynamically. The delivery, in-line, and wafer-in controls 329A, 329B, 329C can include hardware, including a computer, a network, and/or an interface to bridge communication between one another, the entities of system 200, a manufacturing execution system (MES), a computer integrated manufacturing system (CIM), an automatic material handling system (AMHS), a virtual fab, other suitable systems, and/or combinations thereof. It is understood that the bin-based control system 329 may include further controls.

Current bin-based control systems, including the delivery control 329A, in-line control 329B, and/or wafer-in control 329C, implement the bin ratio forecasting methodology at a mass production stage. The delivery control 329A, in-line control 329B, and/or wafer-in control 329C may utilize data received from wafer acceptance tests (WAT) (e.g., intermediary WAT, final WAT), in-line measurements, tool routing, final testing, chip probing (CP) yield to provide bin ratio forecasts during mass production of a plurality of IC devices. Such bin ratio forecasts are based on a kth nearest neighborhood model. Such bin ratio forecasts exhibit a higher than desirable prediction error. It is desired to have a systematic and accurate bin forecasting methodology that is available to predict bin ratios at an earlier manufacturing stage, prior to the mass production stage. In the present embodiment, the bin-based control system 329 implements a bin ratio forecasting methodology that predicts and enables bin ratio forecasting at a stage prior to mass production, particularly, the new tape out stage. Such methodology will be described in more detail below with respect to a method 400.

The customer interface 330 may include an online system 332 and an order management system 334. The online system 332 may function as an interface to communicate with the customer 204, other systems within the service system 202, supporting databases, and other entities 206-214. The order management system 334 may manage client orders and may be associated with a supporting database to maintain client information and associated order information.

The customer 204 may obtain information about the manufacturing of its ICs via the virtual fab 200 using the computer system 204A. In the present example, the customer 204 may access the various entities 202, 206-214 of the virtual fab 200 through the customer interface 330 provided by the service system 202. However, in some situations, it may be desirable to enable the customer 204 to access other entities without going through the customer interface 330. For example, the customer 204 may directly access the fab facility 210 to obtain fabrication related data.

The engineer 206 may collaborate in the IC manufacturing process with other entities of the virtual fab 200 using the computer system 206A. The virtual fab 200 enables the engineer 206 to collaborate with other engineers and a design/lab facility in IC design and testing, to monitor fabrication processes at the fab facility 210, and to obtain information regarding test runs, yields, etc. In some embodiments, the engineer 206 may communicate directly with the customer 204 via the virtual fab 200 to address design issues and other concerns.

The metrology tool 208 (and/or design/lab facility) provides IC design and testing services that may be accessed by other entities via the virtual fab 200. The metrology tool 208 may include electrical, optical, and/or analytical tools, such as microscopes, micro-analytical tools, line width measurement tools, mask and reticle defect tools, particle distribution tools, surface analysis tools, stress analysis tools, resistivity and contact resistance measurement tools, mobility and carrier concentration measurement tools, junction depth measurement tools, film thickness tools, gate oxide integrity test tools, C-V measurement tools, focused ion beam (FIB), and other test and measurement tools. The wafer data may include wafer results such as wafer parameters measured by the metrology tools, such as sheet resistance, reflectivity, stress, particle density, and critical dimension. The wafer data may also comprise other data, such as wafer ID and product type.

The fab facility 210 enables the fabrication of ICs. Control of various aspects of the fabrication process, as well as data collected during the fabrication process, may be accessed via the virtual fab 200. The fab facility 210 may include the computer system 210A and various fabrication hardware and software tools and manufacturing equipment 210B. For example, the fab facility 210 may comprise one or more systems and/or tools, such as a chemical vapor deposition system (CVD), a physical vapor deposition (PVD) system, an etching system, a thermal oxidation system, an ion implantation system, a chemical mechanical polishing system, a rapid thermal annealing system, a photolithography system, metrology tools, other semiconductor fabrication tools, and/or combinations thereof, as well as the software needed to control these components. The system/tool data may include setting values of hardware parameters (or hardware parameter setting data). For example, considering a PVD system, the hardware parameters may include wafer temperature, radio frequency (RF) reflected power, chamber pressure, gas partial pressures, and chuck voltage. The hardware parameters may comprise other parameters not included in a process recipe such as sputtering target thickness and spacing between the target and the wafer for the PVD tool. The system/tool data may further comprise other data, such as tool ID, tool maintenance history, and material specification.

The IP vendor 212 may represent any vendor who provides design IP service including design tools and/or a design library of building blocks, such as standard cell, technical documents, and reference flow.

It is understood that the entities 202-214 of the virtual fab 200, as well as their described interconnections, are for illustration purposes only. Further, it is envisioned that more or fewer entities, both internal and external, may exist within the virtual fab 200, and that some entities may be incorporated into other entities or distributed. For example, the service system 202 may be distributed among the various entities 206-214.

Figure 3:
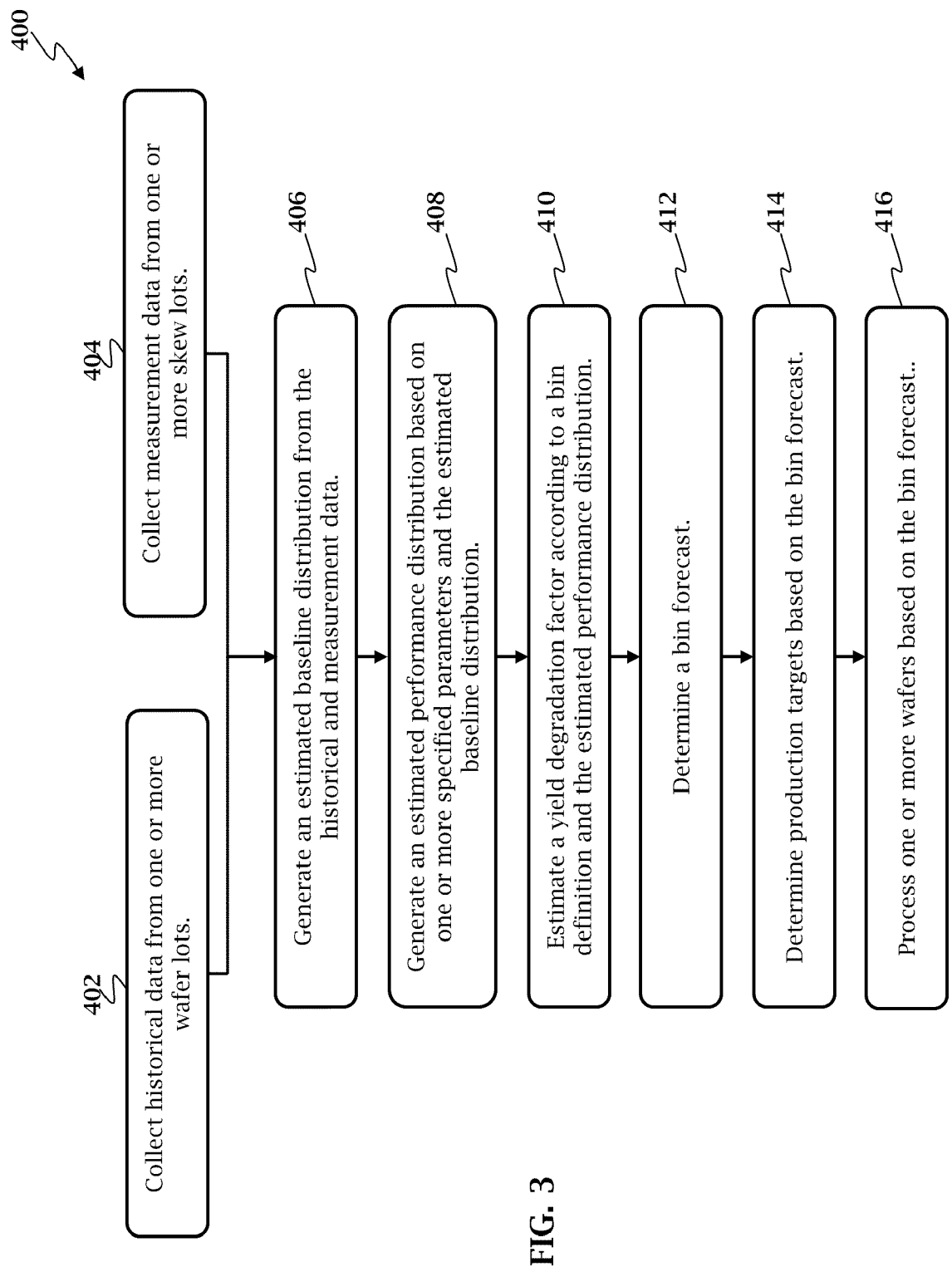
FIG. 3 is a flow chart illustrating a bin-ratio forecasting method according to various aspects of the present disclosure.

Referring to FIG. 3, a method 400 for providing a bin ratio forecast at an early stage of a semiconductor manufacturing process, such as a new tape out stage, is illustrated. The method 400 may be performed by the virtual fab system 200. In some embodiments, the method 400 is implemented by the MES 328 of the virtual fab system 200, particularly the bin-based control system 329. The method 400 provides bin ratio forecasting capability at an early stage of a semiconductor manufacturing process. The method 400 further provides controlling the semiconductor manufacturing process according to the bin ratio forecast. In one embodiment, the method 400 is applicable to one or more bin-based orders of an integrated circuit product from one or more customers. For example, the product is classified into multiple bin categories, such as BIN 1 and BIN 2, according to various electric parameters. A customer may order 10,000 die of the product with 20% of the BIN 1 and 80% of the BIN 2.

At block 402, historical data is collected for one or more wafer lots previously processed. The historical data includes wafer acceptance testing (WAT) measurements (e.g., intermediary WAT and/or final WAT measurements), in-line measurements, chip probe yield measurements, other suitable measurements, and/or combinations thereof. Such measurements provide various WAT parameters, such as current saturation current ($I_{sat}$), resistance, threshold voltage, other suitable parameters, and/or combinations thereof. The measurements also include power, speed, P-delay, and/or $I_{DDQ}$ information of the wafer lots. P-delay represents the propagation delay. $I_{DDQ}$ information arises from $I_{DDQ}$ testing, which measures the supply current ($I_{DD}$) in the quiescent state. $I_{DDQ}$ is the quiescent current, or steady state current.

At block 404, measurement data is collected from one or more skew lots. A skew lot (or a skew wafer lot) is a group of wafers or packaged IC devices that collectively exhibit the full window of allowable variation (typically +/−3 sigma ($\sigma$)) of at least one process parameter of the process being used to manufacture the wafers. A skew lot is fabricated as the product associated with the bin-based orders. For example, the wafers of the skew lot are processed using the processing tools and the recipes for the product. Process parameters can include channel length/width, gate capacitance, saturation current, critical dimension, threshold voltage, other suitable parameter, and/or combinations thereof. A skew lot is typically created by purposely inducing maximum allowable process parameter shifts during wafer fabrication. For example, a customer order specifies a process target. The skew lot may tune device performance of its wafers to exhibit weakest (e.g., characterized by the target −3$\sigma$), typical (e.g., characterized by the target), and strongest (e.g., characterized by the target +3$\sigma$) performance regions. In some embodiments, a skew lot arises from reviewing test results from multiple lots to find a lot that exhibits the full window of allowable variation. The skew lots may comprise a limited number of wafers for processing, such as six to twelve wafers.

The measurement to the skew lot may be similar to the measurement to the wafer lots previously processed for the historical data. The measurement data includes WAT (including intermediary WAT and/or final WAT) measurements, in-line measurements, chip probe yield measurements, other suitable measurements, and/or combinations thereof. Such measurements provide various WAT parameters, such as current (e.g., saturation current), resistance, voltage (e.g., threshold voltage), other suitable parameters, and/or combinations thereof. The measurements also include power, P-delay, and/or $I_{DDQ}$ information of the wafer lots.

Figure 4:
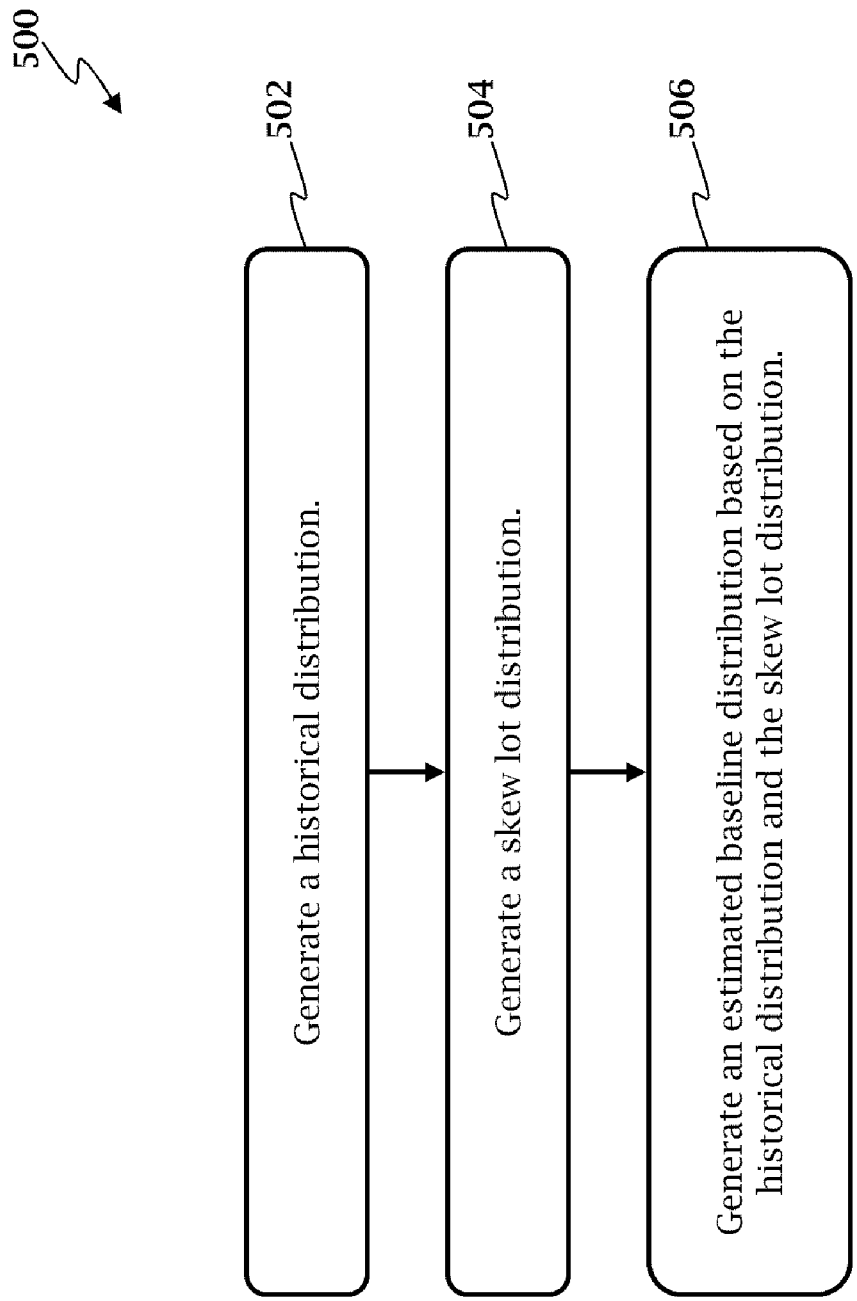
FIG. 4 is a flow chart illustrating a bin-ratio forecasting method according to various aspects of the present disclosure.
Figure 5:
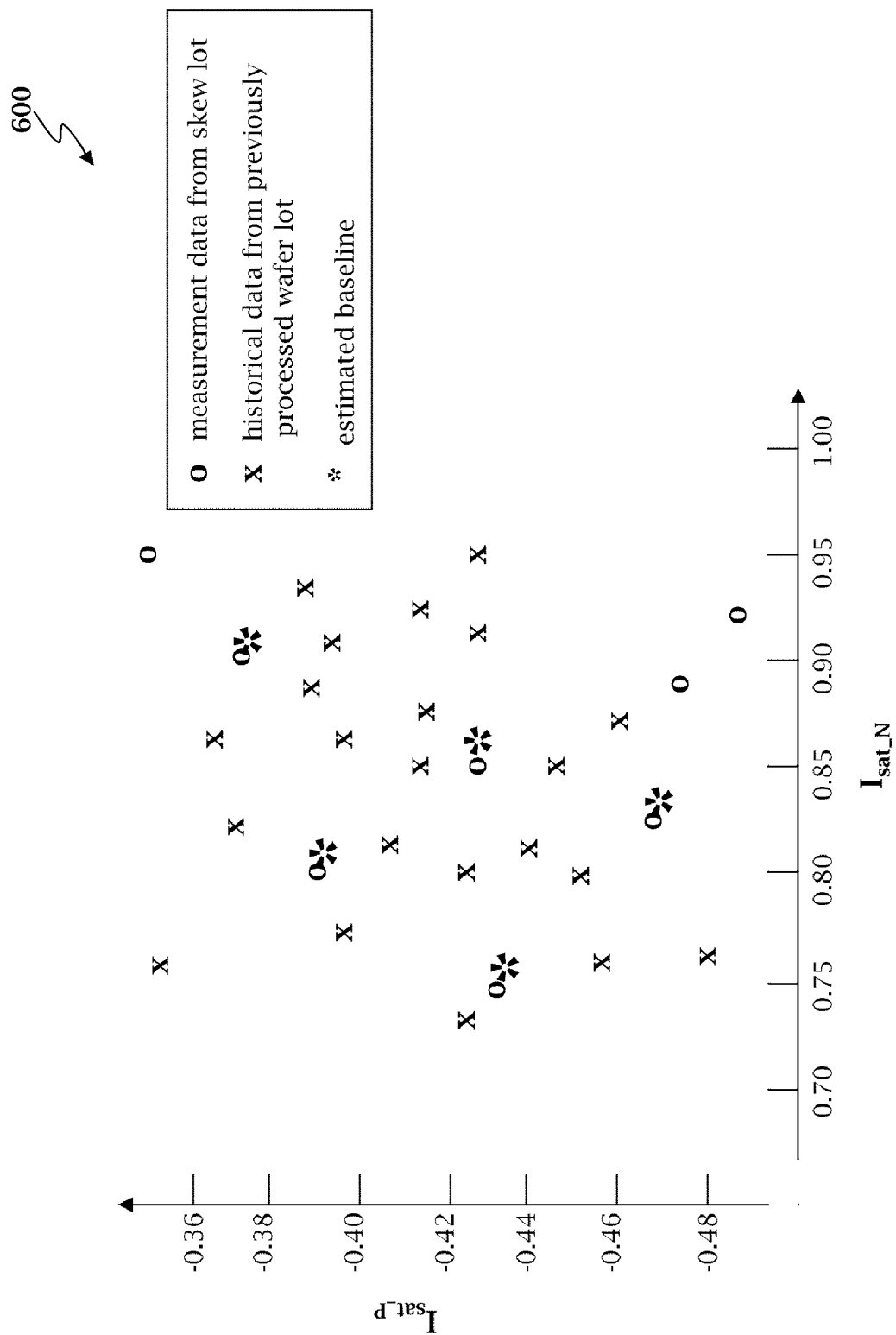
FIG. 5 is an estimated baseline distribution according to various aspects of the present disclosure.

At block 406, an estimated baseline distribution is then generated from the historical data and the measurement data. FIGS. 4 and 5 illustrate an example of the estimated baseline distribution. Referring to FIGS. 4 and 5, a method 500 for generating the estimated baseline distribution and an estimated baseline distribution 600 is provided. The estimated baseline distribution provides an estimated future baseline for subsequently processed wafers for the customer bin-based orders, essentially representing a simulated circuit performance distribution (e.g., speed or leakage). It is based on one or more testing parameters related to the historical and measurement data described above. In the present embodiment, the estimated baseline distribution represented by a graph illustrated in FIG. 5, is derived from saturation current results, particularly, saturation current resulting from PMOS devices ($I_{sat\_P}$) and saturation current resulting from NMOS devices of an IC chip ($I_{sat\_N}$). An x-axis represents the $I_{sat\_N}$ and a y-axis represents the $I_{sat\_P}$. It is understood that the estimated baseline distribution may be generated by any desirable parameters, including power, leakage current, or chip speed.

Generating the estimated baseline distribution begins with block 502 where a historical distribution is generated. The historical distribution represents a simulated WAT baseline data generation, which is derived from the historical data randomly extracted from wafer lots previously processed. The historical data, represented by an x, is then mapped on the graph. Every historical data point x is associated with an $I_{sat\_P}$ and an $I_{sat\_N}$. At block 504, a skew lot distribution is mapped on the same graph. The skew lot distribution is derived from the measurement data extracted from test results of the one or more skew lots. Similarly, every measurement data point, represented by an o, is associated with an $I_{sat\_P}$ and an $I_{sat\_N}$.

The estimated baseline distribution is then generated from the historical distribution and the skew lot distribution at block 506. This is done by performing a minimal distance search (e.g., a mahalonobis minimal distance search) for each historical data point x. Each historical data point x is mapped to its nearest measurement data point o. FIG. 5 provides a simplistic example of this approach. For example, each historical data point x is mapped with the nearest corresponding measurement data point o. When the historical data point x is mapped with the nearest corresponding measurement data point o, the nearest corresponding measurement data point is marked with a * to indicate the estimated baseline data point. So, for every historical data point, there will be a corresponding measurement data point and an estimated baseline. Thus, an estimated baseline point may represent one or more data points, since a given measurement data point o may be the nearest measurement data point for multiple historical data points x.

Figure 6:
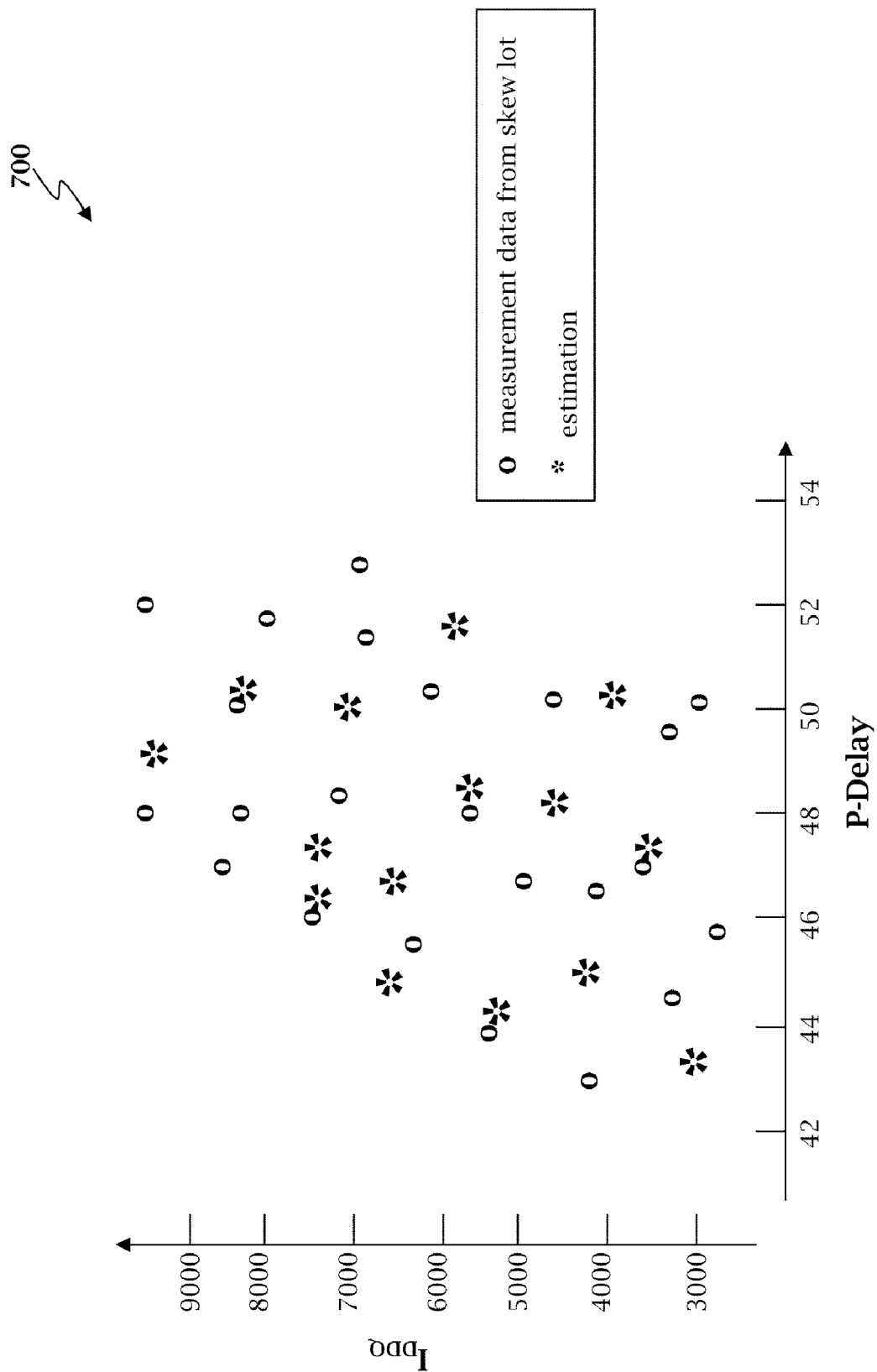
FIG. 6 is an estimated performance distribution according to various aspects of the present disclosure.

Referring again to FIG. 3, at block 408, an estimated performance distribution is generated from the estimated baseline distribution. The estimated performance distribution is based on one or more specified parameters and represents a simulated circuit performance distribution (e.g., speed or leakage). The bin categories are defined by one or more specified parameters, referred to as bin-related parameters, according to the customer bin-based orders. In one embodiment, the bin categories are defined by the parameters P-delay and $I_{DDQ}$. The estimated baseline distribution can be transformed into a space of the bin-related parameters, such as the P-delay and $I_{DDQ}$ space. Particularly, each data point of the estimated baseline distribution is mapped to the space of the bin-related parameters according to the associated values of the bin-related parameters, resulting in a transformed distribution represented by the bin-related parameters. Such transformed distribution is referred to as an estimated performance distribution. In furtherance of the above embodiment, estimated distribution is mapped to P-delay/$I_{DDQ}$ space. In the present embodiment, an estimated performance distribution (or estimated P-delay/$I_{DDQ}$ distribution) 700 is generated as illustrated in FIG. 6.

Figure 7:
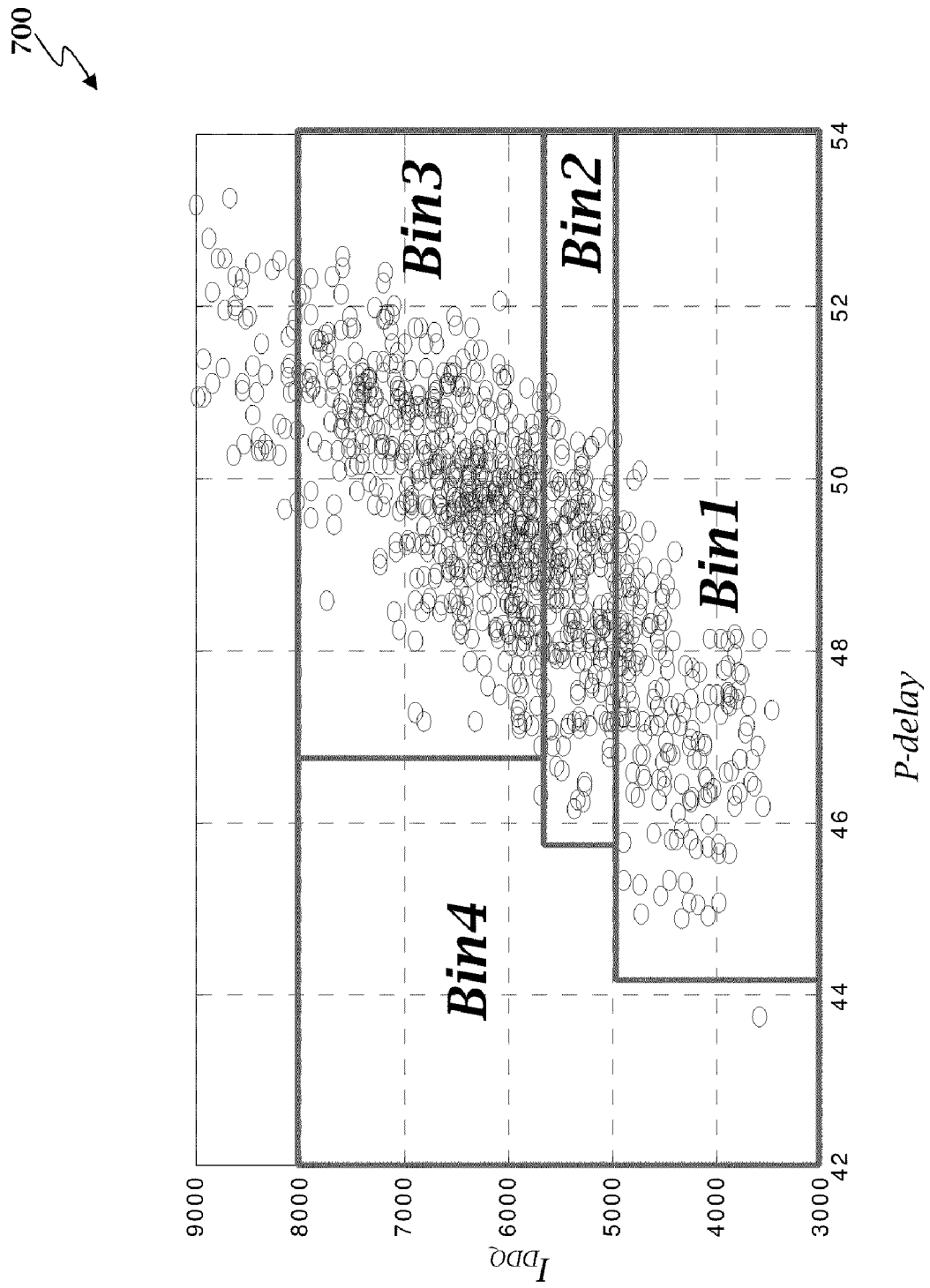
FIG. 7 illustrates a bin definition applied to an estimated performance distribution according to various aspects of the present disclosure.

At block 410, yield degradation factors are estimated according to the estimated performance distribution and a bin definition. As noted above, the bin definition can be derived from a customer's order, specifying IC device characteristics associated with each bin category. For example, a customer may order one million die, requesting that 30% of the die exhibit BIN 3 characteristics and 70% exhibit BIN 1 characteristics. Referring to FIG. 7, the BIN categories are associated with P-delay and $I_{DDQ}$. In the present embodiment, the bin definition is associated with various P-delay values A, B, C, D, and E (approximately 42, 44.2, 45.8, 46.8, and 54, respectively) and various $I_{DDQ}$ values $A_1$, $B_1$, $C_1$, $D_1$ (approximately 3000, 5000, 5700, and 8000, respectively). Thus, IC devices classified as BIN 1 may exhibit a P-delay between B and E and an $I_{DDQ}$ between $A_1$ and $B_1$; IC devices classified as BIN 2 may exhibit a P-delay between C and E and an $I_{DDQ}$ between $B_1$ and $C_1$; IC devices classified as BIN 3 may exhibit a P-delay between D and E and an $I_{DDQ}$ between $C_1$ and $D_1$; and IC devices classified as BIN 4 may exhibit a P-delay between A and B and an $I_{DDQ}$ between $A_1$ and $D_1$.

The yield degradation factor represents the actual die yield estimated in each bin category. Applying the yield degradation factor to the defined bin categories on the estimated performance distribution provided in FIG. 7, the yield degradation factors for BINS 1 through 4 may be represented by F1, F2, F3, and F4. When random effects exist, the die yield number is a constant percentage of a total bin count given by the estimated performance distribution, and in the present embodiment, the $I_{DDQ}$/P-delay distribution. When systematic yield loss factors exist, the die yield number is not a constant, the yield degradation factors are obtained from the estimated performance distribution, and in the present embodiment, the estimated $I_{DDQ}$/P-delay distribution. In one example, the yield degradation factor for each BIN is determined by determining the yield of each individual BIN category. In another example, with reference to FIG. 7, assuming F1=1 due to constraint by a degree of freedom. Specifically, only bin ratios are concerned in the present case, the assumption that one of the yield degradation factors is 1 does not change the bin ratio. It may be also assumed F4=1 due to BIN 4 ratio being <3%. This can simplify the calculation without significant impact to the bin ratios. Then the yield degradation factors F2 and F3 can be defined using a Levenberg-Marquardt approach. Given a bin ratio for BINS 1-4 from n lots (or wafers), the objective function can be defined as below:

$$\min \sum_{i=1}^{4} \sum_{j=1}^{n} (Bin_i^j - Bin_i^j(F2, F3))^2$$

$$\text{s.t.} \quad 0 \leq F2, F3 \leq 1$$

where the term $Bin_i^j$ is the actual bin ratio of the ith bin category and the jth lot counted from the skew lot and the term $Bin_i^j(F2, F3)$ is the bin ratio of the ith bin category and the jth lot counted from the estimated performance distribution (the estimated p-delay and IDDQ distribution is this example). The term $Bin_i^j(F2, F3)$ is the function of the F2 and F3 in this example because the estimated bin ratios depend on the values of the yield degradation factors F2 and F3. So, the yield degradation factor at each individual bin area is applied to estimate the effect of any systematic mechanism limited yield lost. Nonlinear minimization of a prediction error by applying a Levenberg-Marquardt approach can determine the yield degradation factors F2 and F3. In one example, an optimization result may yield F2=0.88 and F3=0.78.

Then, again referring to FIG. 3, at block 412, bin ratios are forecasted. The bin forecast may represent a forecasted bin ratio or a forecasted number of die in each bin category. The forecasted number of die in each bin category can be obtained by applying the bin definition to the estimated performance distribution as previously described, counting the number of die in a particular bin category based on the bin definition, and multiplying the counted number of die in the particular bin category by the yield degradation factor determined for the particular bin category.

At block 414, based on the bin forecast, production targets and wafer quantity can be determined. The production target includes various production indexes associated with the customer's bin based order(s). In one example, the production target includes a number of wafers that need to be started to meet customer demand. The number of wafers can be determined According to the bin forecast. In another example, the production target includes a wafer start time, which can be determined to meet the customer's order schedule according to the forecasted bin ratios and the fabrication cycle time. In some embodiment, process parameters may be determined from the bin forecast. For example, an implantation dose at an ion implantation process may be adjusted to tune one or more electrical parameters, such as p-delay or IDDQ, according to the bin forecast and the customer bin-based order. In this case, such a tunable process parameter is also a part of the production target since the production parameters and bin ratios are adjustable by the tunable process parameter.

At block 416, the method 400 further includes processing a plurality of wafers (lots) according to the customer's bin based order and the bin forecast. In one embodiment, the fabrication resources are provided according to the production targets. In one example, the number of wafers determined at the above step are sent to the fabrication line for processing at the wafer start time determined at the above step. A plurality of semiconductor processing steps are applied to the wafers to form the designed integrated circuit. In one embodiment, the processing steps applied to the wafer can be tuned to meet the production target. For example, if there is a difference between expected bin ratios from the customer's bin based order and the bin forecast, the processing recipes can be adjusted such that the bin ratios can be tuned to meet the bin ratios of the customer's order. In furtherance of the present example, one or more ion implantation processes can be adjusted in term of the implantation does to tune the leakage current such that the bin ratios of the processed wafers is consistent to the bin ratios of the customer's order. In another example, the start wafers can be chosen according to the bin forecast to tune the bin ratios of the processed wafers relative to the bin ratios of the customer's order. In another example, the fabrication procedure, such as processing priority, can be adjusted according to the bin forecast to meet the customer's order bin-based requirement and shipping schedule.

It is understood that the method 400 may be implemented by a manufacturing execution system, such as MES 328 described above, specifically by one or more controls, such as bin-based control 329. For example, the wafer-in control 329C may determine the number of wafers that need to be started from the bin ratio forecast determined by method 400 and direct the start of the determined number of wafers for wafer start. The method 400 may also work in conjunction with other bin ratio forecasting methods.

In summary, the method 400 provides a bin ratio forecast at an early stage of a semiconductor manufacturing process, such as the new tape out stage, with very limited data. The bin ratio forecast generates a simulated wafer acceptance test (WAT) baseline distribution data map and a simulated circuit performance distribution map. These maps may be generated utilizing a minimal distance search. Further, the bin ratio forecast counts yield degradation factors at individual bin categories to estimate the effect of systematic mechanism limited yield loss. The early bin ratio forecast maintains minimal inventory cost and provides on-time delivery. In one example, the bin ratio forecast in the present disclosure can provide a prediction error of <2%, whereas current bin ratio forecasting approaches, typically forecasting at a mass production stage are >5% (and as much as 6% to 8%). The low prediction error is advantageous because the bin ratio forecast prediction error preferably is as low as possible from the perspective of production control and integration engineers. Inventory and/or wafer shortage can be minimized by precise bin ratio forecasting. Furthermore, the semiconductor manufacturing process can be adjusted to tune the bin ratios of the processed wafers according the bin forecast because the bin forecast of the present disclosure is available at the very early stage. It is understood that different embodiments may have different advantages, and that no particular advantage is necessarily required of all embodiments.

The present disclosure can take the form of an entirely hardware embodiment, an entirely software embodiment, or an embodiment containing both hardware and software elements. Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, a semiconductor system (or apparatus or device), or a propagation medium.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   collecting historical data from a plurality of processed wafers lots;
   collecting measurement data from one or more skew wafer lots;
   generating an estimated baseline distribution from the collected historical data and collected measurement data;
   generating an estimated performance distribution from the estimated baseline distribution based on one or more specified parameters and;
   determining a bin ratio forecast by applying a bin definition and a yield degradation factor estimation to the estimated performance distribution;
   determining one or more production targets based on the bin ratio forecast;
   providing fabrication resources according to the one or more production target; and
   processing a plurality of wafers based on the one or more determined production targets.

2. The method of claim 1 wherein collecting historical data from the plurality of wafer lots comprises collecting at least one of wafer acceptance testing, chip product yield, or final testing data.

3. The method of claim 1 wherein collecting the measurement data from one or more skew lots comprises collecting at least one of wafer acceptance testing, chip product yield, or final testing data.

4. The method of claim 1 wherein generating an estimated baseline distribution from the historical and measurement data comprises:
   generating a historical distribution by graphing the historical data as one or more historical data points;

generating a skew lot distribution by graphing the measurement data as one or more measurement data points; and mapping each historical data point to a closest measurement data point, wherein the closest measurement data point is marked as an estimated baseline data point.

5. The method of claim 4 wherein mapping each historical data point to a closest measurement data point comprises performing a minimal distance search.

6. The method of claim 1 wherein the one or more production targets comprises a wafer start time.

7. The method of claim 1 further comprising adjusting a fab process according to the bin ratio forecast.

8. The method of claim 1 wherein generating an estimated performance distribution based on one or more specified parameters comprises specifying $I_{DDQ}$ current and P-delay parameters, generating an $I_{DDQ}$ and P-delay distribution map.

9. The method of claim 1 wherein determining the bin ratio forecast comprises determining a bin ratio forecast prior to a mass production stage.

10. The method of claim 9 wherein determining the bin ratio forecast prior to a mass production stage comprises determining the bin ratio forecast at a new tape out stage.

11. The method of claim 1 wherein determining the bin ratio forecast by applying the bin definition and the yield degradation factor estimation to the estimated performance distribution comprises:

specifying a bin definition for a customer order, wherein the bin definition provides more than one bin category;

applying the bin definition to the estimated performance distribution;

determining a bin count for each bin category based on the bin definition;

determining a yield degradation factor estimation for each bin category; and applying to the bin count the corresponding yield degradation factor estimation.

12. The method of claim 1 wherein determining one or more production targets based on the bin ratio forecast and processing the plurality of wafers based on the one or more determined production targets comprises determining a number of wafers to begin processing.

13. A method for providing a bin ratio forecast prior to a mass production stage of a plurality of integrated circuit devices, the method comprising:

generating a simulated wafer acceptance test (WAT) baseline distribution;

generating a simulated circuit performance distribution from the generated simulated WAT distribution;

portioning the generated simulated circuit performance distribution into at least two bin categories based on a bin definition;

determining a bin ratio forecast by applying a yield degradation factor to each bin category;

determining a wafer quantity and device targets to begin processing based on the determined bin ratio forecast; and processing the determined wafer quantity according to the determined device targets.

14. The method of claim 13 further comprising adjusting a semiconductor manufacturing process according to the bin ratio forecast before processing the determined wafer quantity.

15. The method of claim 13 comprising providing fabrication resources according to the device targets.

16. The method of claim 13 wherein generating a simulated WAT baseline distribution comprises:

generating a historical lot distribution of historical data points extracted from WAT testing data from one or more processed wafer lots;

generating a skew lot distribution of skew lot data points extracted from WAT testing data from one or more skew lots; and performing a minimal distance search for each historical data point to the skew lot distribution.

17. The method of claim 16 wherein performing the minimal distance search comprises utilizing a Mahalonobis minimal distance search.

18. The method of claim 16 wherein applying the yield degradation factor to each bin category comprises obtaining a yield degradation factor for each bin category based on the simulated circuit performance distribution and the skew lot distribution.

19. The method of claim 13 wherein determining a bin ratio forecast by applying a yield degradation factor to each bin category comprises determining a number of IC devices associated with each bin category based on the simulated circuit performance distribution.

20. A system for providing a bin ratio forecast prior to a mass production stage in a semiconductor manufacturing environment, wherein a plurality of processes are performed on a plurality of wafer lots, the system comprising:

a virtual fabrication system coupled to a network;

a manufacturing execution system (MES) coupled to the network, wherein the MES comprises a bin-based control module configured to:

collect historical data from one or more processed wafer lots;

collect measurement data from one or more skew wafer lots;

generate an estimated baseline distribution based on the collected historical data and collected measurement data;

generate an estimated performance distribution based on one or more specified parameters and the generated estimated baseline distribution;

determine a bin ratio forecast by applying a bin definition and a yield degradation factor estimation to the generated estimated performance distribution;

determine one or more production targets based on the bin ratio forecast; and process one or more wafers based on the one or more determined production targets.

* * * * *